US011030727B2

(12) United States Patent
Sato et al.

(10) Patent No.: US 11,030,727 B2
(45) Date of Patent: Jun. 8, 2021

(54) DISPLAY APPARATUS AND DISPLAY METHOD

(71) Applicant: CANON KABUSHIKI KAISHA, Tokyo (JP)

(72) Inventors: Masahiro Sato, Tokyo (JP); Hirofumi Urabe, Tokyo (JP); Takehito Fukushima, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/111,495

(22) Filed: Aug. 24, 2018

(65) Prior Publication Data

US 2018/0365817 A1 Dec. 20, 2018

Related U.S. Application Data

(63) Continuation of application No. 15/466,686, filed on Mar. 22, 2017, now Pat. No. 10,096,095.

(30) Foreign Application Priority Data

Mar. 30, 2016 (JP) .................................. 2016-068433

(51) Int. Cl.
*G06T 5/00* (2006.01)
*G06T 11/60* (2006.01)

(52) U.S. Cl.
CPC .............. *G06T 5/007* (2013.01); *G06T 5/009* (2013.01); *G06T 11/60* (2013.01); *G06T 2207/20208* (2013.01)

(58) Field of Classification Search
CPC ........... G06T 5/007; G06T 2207/20208; G06T 2320/0233; G06T 11/60; G06T 5/009
See application file for complete search history.

(56) References Cited

U.S. PATENT DOCUMENTS 9,501,855 B2     11/2016   Abia et al.
10,096,095 B2 *  10/2018   Sato ..................... G06T 5/009
                         (Continued)

FOREIGN PATENT DOCUMENTS

JP    H05-300453 A    11/1993
JP    2017-169097 A    9/2017
JP    2017-175422 A    9/2017

OTHER PUBLICATIONS

Chris Chinnock, "The Status of Wide Color Gamut UHD-TVs," White Paper, Insight Media, Jan. 2016, pp. 1-57.
(Continued)

*Primary Examiner* — Antonio A Caschera
(74) *Attorney, Agent, or Firm* — Venable LLP

(57) ABSTRACT

A display apparatus includes: a display unit; an acquiring unit configured to acquire brightness information that is information related to display brightness; and a correcting unit configured to, in a case where a first image that is an image based on first image data having a first dynamic range and a second image that is an image based on second image data having a second dynamic range narrower than the first dynamic range are displayed on a screen, correct the second image data so that the first image is displayed in accordance with the display brightness related to the brightness information and the second image is displayed in accordance with display brightness that is lower than the display brightness related to the brightness information.

33 Claims, 9 Drawing Sheets

(56) References Cited

U.S. PATENT DOCUMENTS

| | | |
|---|---|---|
| 2015/0213586 A1 | 7/2015 | Koike et al. |
| 2016/0189409 A1 | 6/2016 | Aiba et al. |
| 2016/0344990 A1 | 11/2016 | Kozuka et al. |
| 2017/0098295 A1 | 4/2017 | Urabe et al. |
| 2017/0311034 A1 | 10/2017 | Nishi et al. |
| 2017/0330499 A1* | 11/2017 | Nakagoshi ............ G09G 3/003 |

OTHER PUBLICATIONS

"UHD HDR/WCG to become mainstream," Display Daily, Jan. 23, 2016, pp. 1-4.
"Samsung Announces HDR + Firmware Update for 2016 SUHD TVs," Samsung, Jul. 27, 2016, pp. 1-4.
HDR/SDR 2 Split-Screen Display, Technical Report, Canon website, 2020, p. 1.

* cited by examiner

| GRADATION CHARACTERISTICS | GAMMA 2.2 | GAMMA 2.6 | HLG | PQ |
|---|---|---|---|---|
| DYNAMIC RANGE | SDR | SDR | HDR | HDR |

DISPLAY APPARATUS AND DISPLAY METHOD

This application is a continuation of application Ser. No. 15/466,686 filed Mar. 22, 2017.

BACKGROUND OF THE INVENTION

Field of the Invention

The present invention relates to a display apparatus and a display method.

Description of the Related Art

Recently, in the field of image production, opportunities to handle image data (image data of a still image or a moving image) with a wider dynamic range than a conventional dynamic range have increased. Hereinafter, a conventional dynamic range will be described as a "standard dynamic range (SDR)" and a dynamic range wider than the SDR will be described as a "high dynamic range (HDR)". Further, standards (for example, ST2084 standardized by the Society of Mot ion Picture and Television Engineers (SMPTE)) for transmitting HDR image data with a serial digital interface (SDI) cable are proposed. Techniques for displaying an HDR image with high brightness are also proposed. HDR image data refers to image data with an HDR, and an HDR image refers to an image based on HDR image data.

Meanwhile, in the field of broadcasting, broadcasts of SDR image data have become mainstream. SDR image data refers to image data with an SDR. Not all display apparatuses accommodate an HDR, and there are display apparatuses which do not accommodate an HDR. Therefore, there are cases where both HDR image data and SDR image data are generated. Methods of generating HDR image data and SDR image data include generating HDR image data by photography and then generating SDR image data by a grading operation based on the HDR image data. In a grading operation, there is a need to check an HDR image and an SDR image at the same time. Therefore, in a grading operation, both an HDR image and an SDR image may be displayed on a display apparatus. An SDR image refers to an image based on SDR image data.

Since HDR image data has a wide dynamic range, an HDR image is favorably displayed with high display brightness such as 1000 [cd/m$^2$]. Display brightness refers to brightness of a screen. In addition, an SDR image is favorably displayed with display brightness (for example, 100 [cd/m$^2$]) which is lower than the display brightness of an HDR image. Display brightness control methods include a method of controlling emission brightness of a backlight unit. Specifically, the method involves increasing display brightness by increasing the emission brightness of the backlight unit and reducing display brightness by reducing the emission brightness of the backlight unit. The emission brightness of a backlight unit refers to brightness of light emitted from the backlight unit.

By enabling the emission brightness of the backlight unit to be individually controlled in an area corresponding to a display area of an HDR image and an area corresponding to a display area of an SDR image, display of an HDR image with high brightness and an SDR image with low brightness can be realized by one display apparatus. A display area of an image is an area of a screen in which the image is displayed. However, adopting a configuration which enables emission brightness of a backlight unit to be partially changed significantly increases cost.

Techniques related to the control of display brightness include a technique disclosed in Japanese Patent Application Laid-open No. H5-300453. In the technique disclosed in Japanese Patent Application Laid-open No. H5-300453, for each of a plurality of blocks constituting a screen, image data corresponding to the block is corrected by correction data corresponding to the block. However, the technique disclosed in Japanese Patent Application Laid-open No. H5-300453 is a technique for reducing unevenness in brightness of a display image (an image displayed on the screen). Therefore, even when the technique disclosed in Japanese Patent Application Laid-open No. H5-300453 is used, an HDR image and an SDR image cannot be respectively displayed with favorable brightness (appropriate brightness).

SUMMARY OF THE INVENTION

The present invention provides a technique which enables, in a case of displaying a plurality of images on a screen, each image to be displayed with favorable brightness with a simple configuration.

The present invention in its first aspect provides a display apparatus, comprising:
 a display unit configured to display an image on a screen;
 an acquiring unit configured to acquire brightness information that is information related to display brightness; and
 a correcting unit configured to, in a case where a first image that is an image based on first image data having a first dynamic range and a second image that is an image based on second image data having a second dynamic range narrower than the first dynamic range are displayed on the screen, correct the second image data so that the first image is displayed in accordance with the display brightness related to the brightness information and the second image is displayed in accordance with display brightness that is lower than the display brightness related to the brightness information.

The present invention in its second aspect provides a display method, comprising:
 an acquiring step of acquiring brightness information that is information related to display brightness;
 a correcting step of, in a case where a first image that is an image based on first image data having a first dynamic range and a second image that is an image based on second image data having a second dynamic range narrower than the first dynamic range are displayed on a screen, correcting the second image data so that the first image is displayed in accordance with the display brightness related to the brightness information and the second image is displayed in accordance with display brightness that is lower than the display brightness related to the brightness information; and
 a display step of displaying an image on the screen.

The present invention in its third aspect provides a non-transitory computer readable medium that stores a program, wherein the program causes a computer to execute:
 an acquiring step of acquiring brightness information that is information related to display brightness;
 a correcting step of, in a case where a first image that is an image based on first image data having a first dynamic range and a second image that is an image based on second image data having a second dynamic range narrower than the first dynamic range are displayed on a screen, correcting the second image data so that the first image is displayed in accordance with the display brightness related to the brightness information and the second image is displayed in accordance with display brightness that is lower than the display brightness related to the brightness information; and a display step of displaying an image on the screen.

According to the present invention, in a case of displaying a plurality of images on a screen, each image can be displayed with favorable brightness with a simple configuration.

Further features of the present invention will become apparent from the following description of exemplary embodiments with reference to the attached drawings.

DESCRIPTION OF THE EMBODIMENTS

First Embodiment

A first embodiment of the present invention will be described below. Moreover, while an example in which an image processing apparatus according to the present embodiment is provided in a display apparatus will be hereinafter described, the image processing apparatus may be a separate apparatus from the display apparatus. As the image processing apparatus, for example, a personal computer (PC) can be used. In addition, while an example in which a display apparatus is a liquid crystal display apparatus will be hereinafter described, the display apparatus is not limited to a liquid crystal display apparatus. For example, other display apparatuses including a display panel and a light emitting unit which emits light to the display panel may be used. The display panel displays an image on a screen by transmitting light from the light emitting unit. Specifically, a micro electro mechanical system (MEMS) shutter system display apparatus which uses a MEMS shutter, a projector, or the like may be used. A self-luminous display apparatus such as an organic EL display apparatus and a plasma display apparatus may also be used.

Figure 1:
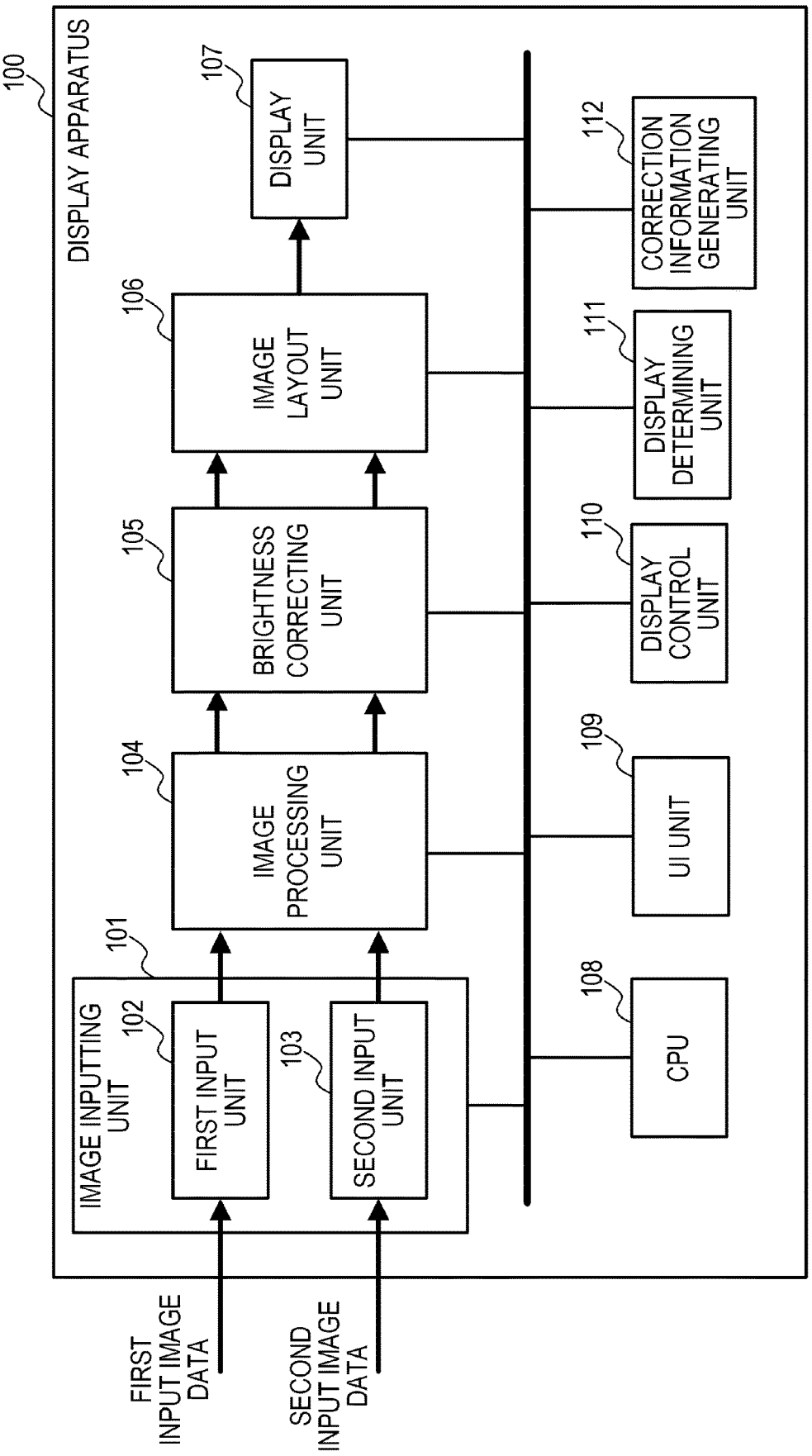
FIG. 1 is a block diagram showing an example of a configuration of a display apparatus according to a first embodiment.

FIG. 1 is a block diagram showing an example of a configuration of a display apparatus 100 according to the present embodiment. The display apparatus 100 includes an image inputting unit 101, an image processing unit 104, a brightness correcting unit 105, an image layout unit 106, a display unit 107, a CPU 108, a user interface (UI) unit 109, a display control unit 110, a display determining unit 111, and a correction information generating unit 112.

The image inputting unit 101 acquires image data (input image data) from outside of the display apparatus 100 and outputs the input image data to the image processing unit 104. The image inputting unit 101 includes, for example, an SDI input terminal and a processing circuit. The SDI input terminal is an input terminal in compliance with the serial digital interface (SDI) standard. The processing circuit subjects image data input to the SDI input terminal to a predetermined process and outputs the image data after being subjected to the predetermined process to the image processing unit 104. The predetermined process is, for example, a process of converting a data format of the image data into a data format processible inside the display apparatus 100.

In the present embodiment, the image inputting unit 101 includes a first input unit 102 and a second input unit 103. The first input unit 102 and the second input unit 103 respectively acquire input image data and output the input image data to the image processing unit 104. Hereinafter, input image data acquired by the first input unit 102 will be described "first input image data" and input image data acquired by the second input unit 103 will be described "second input image data". The first input image data may be the same as or may differ from the second input image data.

Based on gradation characteristic information (information related to gradation characteristics) set by the display control unit 110, the image processing unit 104 converts gradation characteristics of input image data into the gradation characteristics related to the gradation characteristic information. As a result, converted image data is generated. The image processing unit 104 outputs the converted image data to the brightness correcting unit 105. For example, gradation characteristics of input image data are converted using conversion information corresponding to gradation characteristic information. Gradation characteristics are characteristics related to a correspondence relationship between gradation values and brightness. Conversion information is information (a one-dimensional lookup table, function, or the like) indicating a correspondence relationship between gradation values of input image data and conversion correction values for correcting the gradation values of the input image data to gradation values of converted image data or gradation values of the converted image data.

In the present embodiment, first characteristic information which is gradation characteristic information corresponding to first input image data and second characteristic information which is gradation characteristic information corresponding to second input image data can be set individually. In a case where first input image data is input to the image processing unit 104, the image processing unit 104 generates first converted image data by converting the gradation characteristics of the first input image data based on the first characteristic information, and outputs the first converted image data to the brightness correcting unit 105. In a case where second input image data is input to the image processing unit 104, the image processing unit 104 generates second converted image data by converting the gradation characteristics of the second input image data based on the second characteristic information, and outputs the second converted image data to the brightness correcting unit 105.

The brightness correcting unit 105 generates corrected image data by correcting converted image data using correction information generated by the correction information generating unit 112 to be described later. In addition, the brightness correcting unit 105 outputs the corrected image data to the image layout unit 106. In the present embodiment, correction information is a brightness correction value (a single brightness correction value shared among a plurality of possible gradation values of converted image data) for converting each gradation value of converted image data into a gradation value of corrected image data. As correction information, information (a one-dimensional lookup table, function, or the like) indicating a correspondence relationship between gradation values of converted image data and brightness correction values for correcting gradation values of the converted image data to gradation values of corrected image data or gradation values of the corrected image data can also be used. The brightness correction value is, for example, a gain value by which a gradation value is to be multiplied or an offset value to be added to a gradation value.

In the present embodiment, first correction information which is correction information corresponding to first converted image data and second correction information which is correction information corresponding to second converted image data can be determined individually. In a case where the first converted image data is input to the brightness correcting unit 105, the brightness correcting unit 105 generates first corrected image data by correcting the first converted image data using the first correction information, and outputs the first corrected image data to the image layout unit 106. In a case where the second converted image data is input to the brightness correcting unit 105, the brightness correcting unit 105 generates second corrected image data by correcting the second converted image data using the second correction information, and outputs the second corrected image data to the image layout unit 106.

The image layout unit 106 generates display image data by performing, based on layout information set by the display control unit 110, a layout process of arranging a corrected image which is an image based on corrected image data. In a case where only first corrected image data is input to the image layout unit 106, the image layout unit 106 generates display image data by performing a layout process of arranging a first corrected image which is an image based on the first corrected image data. In a case where only second corrected image data is input to the image layout unit 106, the image layout unit 106 generates display image data by performing a layout process of arranging a second corrected image which is an image based on the second corrected image data. In addition, in a case where both the first corrected image data and the second corrected image data are input to the image layout unit 106, the image layout unit 106 generates display image data by performing a layout process of arranging the first corrected image and the second corrected image. The image layout unit 106 outputs display image data to the display unit 107. Layout information is information indicating a display area of a corrected image. A display area of an image is an area of a screen in which the image is displayed. As layout information, for example, a representative coordinate (a start point coordinate, an end point coordinate, a center coordinate, or the like) of a display area, a combination of a start point coordinate of a display area and an end point coordinate of the display area, a combination of a representative coordinate of a display area and a size (width and height) of the display area, or the like is used.

The display unit 107 displays an image based on display image data based on brightness information (information related to display brightness) set by the display control unit 110. Display brightness refers to brightness of a screen. While a resolution (screen resolution) of the display unit 107 is not particularly limited, in the present embodiment, the display unit 107 has a resolution of 4190 horizontal pixels× 2160 vertical pixels. In the present embodiment, the display unit 107 includes a backlight unit (a light emitting unit) and a liquid crystal panel (a display panel). The backlight unit emits light with emission brightness in accordance with brightness information to the liquid crystal panel. The emission brightness of a backlight unit refers to brightness of light emitted from the backlight unit. In the present embodiment, information related to an upper limit of display brightness (upper limit display brightness) is used as brightness information. In addition, with respect to an area of an entire liquid crystal panel (an entire display panel; an entire screen) including an area in which an HDR image is to be displayed and an area in which an SDR image is to be displayed, the backlight unit emits light with emission brightness corresponding to display brightness (upper limit display brightness) related to the brightness information. Emission brightness corresponding to display brightness (upper limit display brightness) related to the brightness information is, for example, emission brightness that is the same as the upper limit display brightness or emission brightness that is higher than the upper limit display brightness. Specifically, the emission brightness of the backlight unit is controlled so that display brightness corresponding to an upper limit of gradation values input to the display unit 107 coincides with display brightness (upper limit display brightness) related to brightness information. The liquid crystal panel transmits light from the backlight unit at a transmittance in accordance with display image data. Accordingly, an image based on the display image data is displayed.

Moreover, the display brightness related to brightness information is not limited to the upper limit display brightness. In addition, a configuration of the display unit 107 is not limited to the configuration described above. For example, the display unit 107 may be a self-luminous display panel. In a case where the display unit 107 is a self-luminous display panel, for example, a correspondence relationship between a gradation value input to the display unit 107 and display brightness is changed in accordance with brightness information. Specifically, the correspondence relationship between a gradation value input to the display unit 107 and display brightness is changed so that display brightness corresponding to an upper limit of gradation values input to the display unit 107 coincides with display brightness (upper limit display brightness) related to brightness information.

The CPU 108 controls operations of the display apparatus 100 in accordance with a program stored in a nonvolatile memory (not shown).

The UI unit 109 receives a user operation performed on the display apparatus 100 and performs a process in accordance with the performed user operation. As the UI unit 109, for example, buttons provided on a chassis of the display apparatus 100, a remote controller, a keyboard, a mouse, or the like is used. In the present embodiment, the UI unit 109 receives a user operation for specifying display brightness (upper limit display brightness), a user operation for specifying gradation characteristics of converted image data, and the like. While gradation characteristics that can be specified by the user are not particularly limited, in the present embodiment, the user can specify any of gamma 2.2 characteristics, gamma 2.6 characteristics, Hybrid Log Gamma (HLG) characteristics, and PQ characteristics. In addition, the user can individually specify gradation characteristics of first converted image data and gradation characteristics of second converted image data.

The gamma 2.2 characteristics are gradation characteristics with a gamma value of 2.2 and gamma 2.6 characteristics are gradation characteristics with a gamma value of 2.6. The gamma 2.2 characteristics, the gamma 2.6 characteristics, and the like are referred to as "gamma characteristics", and a process of converting gradation characteristics into gamma characteristics is referred to as "gamma correction", "gamma conversion", or the like. Hybrid Log Gamma (HLG) characteristics are gradation characteristics which combines log characteristics in which a gradation value increases logarithmically with an increase in brightness and gamma characteristics with each other. PQ characteristics are gradation characteristics corresponding to ST2084 which is a standard established by the Society of Motion Picture and Television Engineers (SMPTE).

Figures 2, 3:
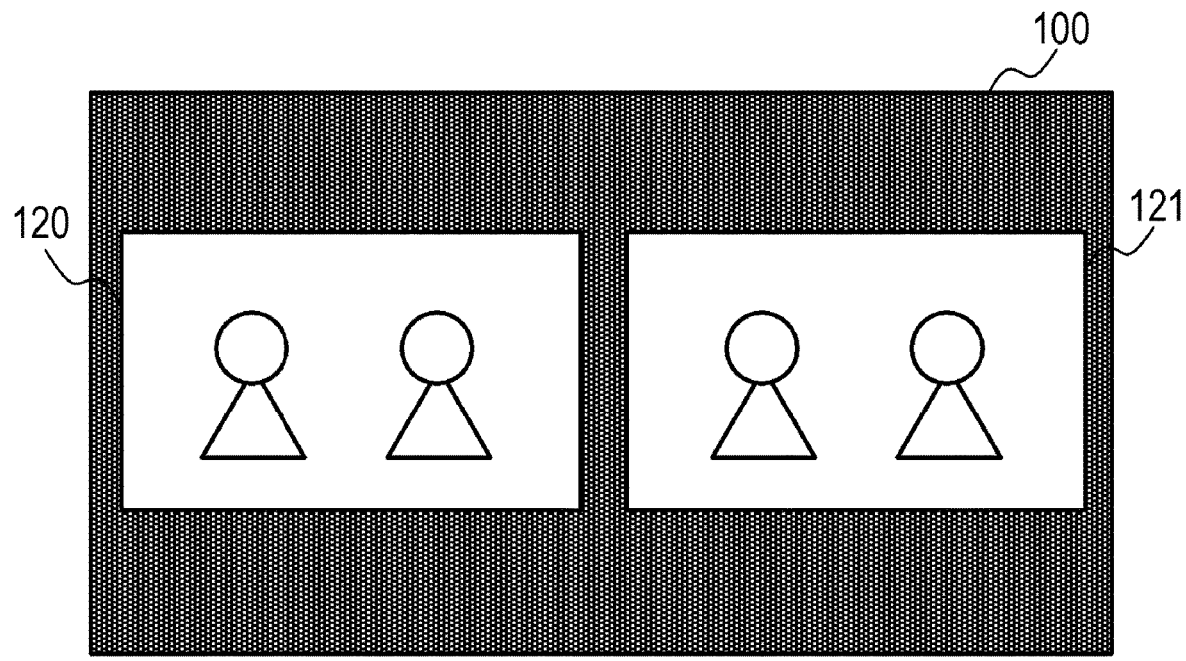
FIG. 2 is a diagram showing an example of a relationship between gradation characteristics and dynamic ranges according to the first embodiment.
FIG. 3 is a diagram showing an example of a display image according to the first embodiment.

In the present embodiment, dynamic ranges corresponding to gradation characteristics are classified into any of two dynamic ranges: a high dynamic range (HDR) and a standard dynamic range (SDR). Specifically, as shown in FIG. 2, dynamic ranges corresponding to the gamma 2.2 characteristics and dynamic ranges corresponding to the gamma 2.6 characteristics are classified as SDRs. In addition, dynamic ranges corresponding to the HLG characteristics and dynamic ranges corresponding to the PQ characteristics are classified as HDRs. An SDR is a previously widely-used dynamic range and an HDR is a dynamic range which is wider than an SDR. In addition, in the present embodiment, image data with an HDR (a first dynamic range) will be described as "HDR image data (first image data)", and an image based on HDR image data (first image data) will be described as an "HDR image (a first image)". Furthermore, in the present embodiment, image data with an SDR (a second dynamic range) will be described as "SDR image data (second image data)", and an image based on SDR image data (second image data) will be described as an "SDR image (a second image)".

As described above, gradation characteristics such as the gamma 2.2 characteristics, the gamma 2.6 characteristics, the HLG characteristics, the PQ characteristics, and the like which are specified by the user are gradation characteristics of converted image data. Therefore, in the present embodiment, HDR image data and SDR image data are image data generated by the image processing unit 104. Moreover, the first dynamic range is not limited to an HDR and the second dynamic range is not limited to an SDR. As long as the second dynamic range is narrower than the first dynamic range, the first dynamic range and the second dynamic range may be any dynamic range.

The UI unit 109 acquires (generates) brightness information in accordance with a user operation for specifying upper limit display brightness, records the brightness information in a volatile memory (not shown), and issues a predetermined brightness setting notification (a notification that upper limit display brightness has been specified) to the display control unit 110. In addition, the UI unit 109 acquires (generates) gradation characteristic information in accordance with a user operation for specifying gradation characteristics of converted image data, records the gradation characteristic information in a volatile memory (not shown), and issues a predetermined characteristic setting notification (a notification that gradation characteristics have been specified) to the display control unit 110. Moreover, after brightness information is recorded in the volatile memory, recording (updating) of brightness information and a predetermined brightness setting notification (a notification that brightness information has been updated) may be performed in only case where the upper limit display brightness is changed. In addition, after gradation characteristic information is recorded in the volatile memory, recording (updating) of gradation characteristic information and a predetermined characteristic setting notification (a notification that gradation characteristic information has been updated) may be performed in only case where the gradation characteristics of the converted image data is changed.

The display control unit 110 reads gradation characteristic information from the volatile memory in response to the characteristic setting notification by the UI unit 109, and sets the read gradation characteristic information to the image processing unit 104. In addition, the display control unit 110 reads brightness information from the volatile memory in response to the brightness setting notification by the UI unit 109, and sets the read brightness information to the display unit 107. Furthermore, the display control unit 110 sets layout information in accordance with the number of pieces of input image data to the image layout unit 106. For example, in a case where there is one piece of input image data, layout information is set which indicates a central part of the screen, an entire area of the screen, or the like as a display area of a corrected image. In a case where there are two pieces of input image data, layout information is set which indicates display areas laterally arranged side by side so that a first corrected image and a second corrected image are displayed so as to be laterally arranged side by side. FIG. 3 is a diagram showing an example of display images (images displayed on a screen) in a case where there are two pieces of input image data. In the example shown in FIG. 3, a first corrected image 120 is displayed on the left and a second corrected image 121 is displayed on the right. Alternatively, layout information indicating a specified display area may be generated in accordance with a user operation specifying the display area.

The display determining unit 111 determines whether or not an HDR image and an SDR image are displayed on the display unit 107 (screen), and outputs a determination result to the correction information generating unit 112. While a determination method is not particularly limited, in the present embodiment, the display determining unit 111 determines whether or not an HDR image and an SDR image are displayed on the display unit 107 based on gradation characteristic information set to the image processing unit 104. Specifically, in a case where a plurality of pieces of input image data are input to the display apparatus 100 and both gradation characteristic information corresponding to an HDR and gradation characteristic information corresponding to an SDR are set, the display determining unit 111 determines that an HDR image and an SDR image are displayed. Otherwise, the display determining unit 111 determines that only one of an HDR image and an SDR image is displayed. Gradation characteristic information corresponding to an HDR is gradation characteristic information corresponding to the HLG characteristics, the PQ characteristics, and the like. Gradation characteristic information corresponding to an SDR is gradation characteristic information corresponding to the gamma 2.2 characteristics, the gamma 2.6 characteristics, and the like. Alternatively, the display determining unit 111 may determine whether or not an HDR image and an SDR image are displayed on the display unit 107 in accordance with a user operation. Specifically, the display determining unit 111 may determine whether or not an HDR image and an SDR image are displayed on the display unit 107 by detecting whether or not a user operation for specifying a display mode which causes the display unit 107 to display an HDR image and an SDR image has been performed. In addition, in a display mode for displaying a plurality of images, the display determining unit 111 may determine whether or not an HDR image and an SDR image are displayed on the display unit 107 by detecting whether or not a user operation for specifying display of a plurality of images including an HDR image and an SDR image has been performed.

The correction information generating unit 112 generates correction information based on a determination result of the display determining unit 111 and outputs the generated correction information to the brightness correcting unit 105. While correction information and a generation method thereof are not particularly limited, in the present embodiment, a single brightness correction value which is shared among a plurality of possible gradation values of converted image data is generated (determined) as correction information. In addition, in the present embodiment, a gain value by which a gradation value is to be multiplied is generated as a brightness correction value.

In the present embodiment, in a case where it is determined that both an HDR image and an SDR image are displayed, the correction information generating unit 112 determines the first correction information (the first brightness correction value) and the second correction information (the second brightness correction value) so as to satisfy Conditions 1 and 2 below.

Condition 1: an HDR image is displayed in accordance with display brightness related to brightness information.

Condition 2: an SDR image is displayed in accordance with display brightness that is lower than display brightness related to brightness information.

Specifically, the correction information generating unit 112 calculates a brightness correction value for correcting converted image data that is SDR image data based on brightness information (upper limit display brightness) set to the display unit 107. More specifically, the correction information generating unit 112 calculates the brightness correction value using Expression 1 below. In Expression 1, "display gamma" refers to a gamma value of the display unit 107 (liquid crystal panel). While a value of the display gamma is not particularly limited, in the present embodiment, the value of the display gamma is 2.2.

Brightness correction value=$(100[cd/m^2]/$upper limit display brightness$[cd/m^2])^{1/display\ gamma}$ (Expression 1)

As described earlier, in the present embodiment, the backlight unit emits light with emission brightness corresponding to display brightness (upper limit display brightness) related to the brightness information. Therefore, by using the brightness correction value calculated by Expression 1, SDR image data is corrected so that an SDR image is displayed in accordance with predetermined display brightness ($100\ [cd/m^2]$). Specifically, SDR image data is corrected so that an upper limit of the display brightness of an SDR image coincides with $100\ [cd/m^2]$. However, the predetermined display brightness is not limited to 100 $[cd/m^2]$.

In addition, the correction information generating unit 112 outputs 1 as a brightness correction value for correcting converted image data that is HDR image data. In a case where a brightness correction value of 1 is used, same image data as the converted image data is obtained as corrected image data. Therefore, in the present embodiment, from converted image data that is HDR image data, corrected image data that is the same as the converted image data is generated. In other words, HDR image data is not corrected. As a result, an HDR image is displayed in accordance with display brightness related to brightness information. Specifically, an HDR image is displayed with display brightness coinciding with display brightness of which an upper limit is related to brightness information.

In addition, in the present embodiment, in a case where it is determined that only one of an HDR image and an SDR image is displayed, the correction information generating unit 112 outputs 1 as the first brightness correction value and the second brightness correction value. Alternatively, in a case where the brightness correction value is 1, correction of converted image data (a process of multiplying each gradation value of the converted image data by the brightness correction value) may be omitted and the converted image data may be used as the corrected image data. In addition, in a case where both an HDR image and an SDR image are displayed, the HDR image data may be corrected in addition to the SDR image data.

Figure 4:
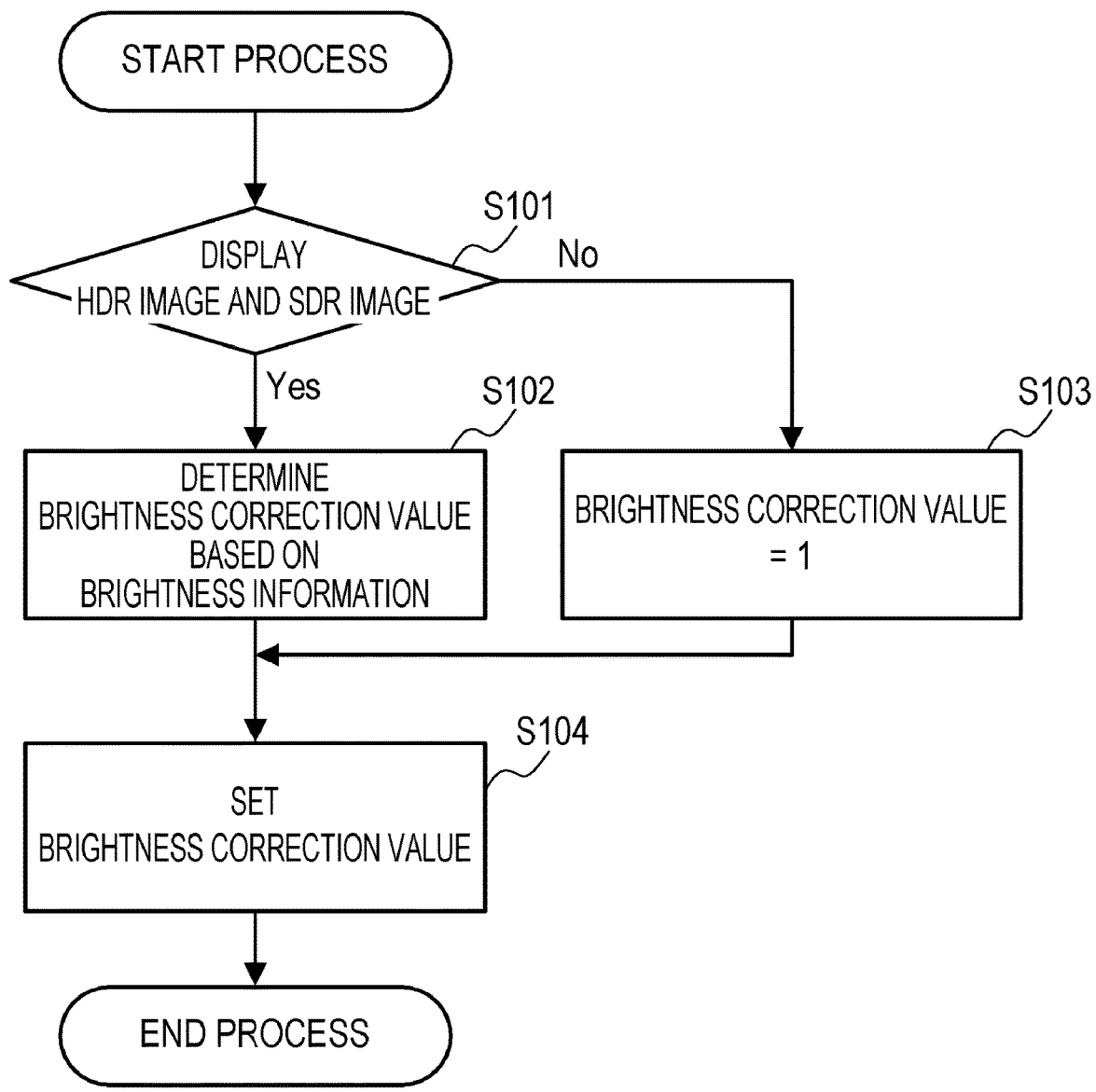
FIG. 4 is a flowchart showing an example of a process flow of the display apparatus according to the first embodiment.

An example of a process flow of the display apparatus 100 will now be described with reference to the flow chart shown in FIG. 4. A timing at which the flow chart shown in FIG. 4 is started is not particularly limited. For example, a start of the flow chart shown in FIG. 4 may be triggered by an issuance of a notification (a brightness setting notification, a characteristic setting notification, or the like) from the UI unit 109 to the display control unit 110.

First, the display determining unit 111 determines whether or not an HDR image and an SDR image are displayed on the display unit 107 based on gradation characteristic information set to the image processing unit 104 (S101). For example, it is determined that an HDR image and an SDR image are displayed in a case where first input image data and second input image data are input to the display apparatus 100, the first characteristic information corresponds to the HLG characteristics, and the second characteristic information corresponds to the gamma 2.2 characteristics.

In a case where it is determined that an HDR image and an SDR image are displayed (S101: Yes), the correction information generating unit 112 calculates a brightness correction value corresponding to the SDR image using Expression 1 (S102). In addition, the correction information generating unit 112 adopts 1 as a brightness correction value corresponding to the HDR image. For example, in a case where the first characteristic information corresponds to the HLG characteristics, the second characteristic information corresponds to the gamma 2.2 characteristics, and brightness information (upper limit display brightness) is 400 $[cd/m^2]$, 1 is adopted as the first brightness correction value. In addition, $0.53\ (=(1/400)^{1/2.2})$ is calculated as the second brightness correction value. Subsequently, the process is advanced to S103.

In a case where it is determined that only one of an HDR image and an SDR image is displayed (S101: No), the correction information generating unit 112 adopts 1 as both the first brightness correction value and the second brightness correction value (S103). Subsequently, the process is advanced to S104.

Subsequently, the correction information generating unit 112 sets the adopted (calculated) brightness correction value to the brightness correcting unit 105 (S104).

Figure 5A:
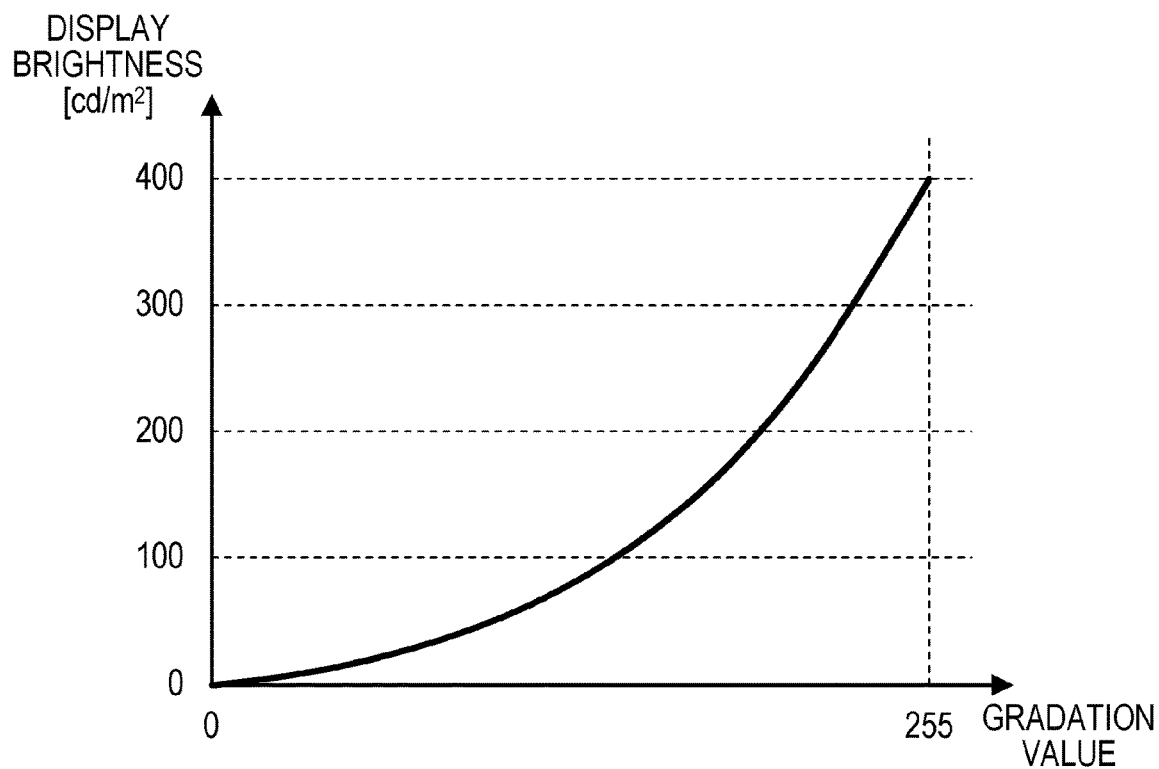
FIGS. 5A and 5B are diagrams showing examples of a relationship between gradation values and display brightness according to the first embodiment.
Figure 5B:
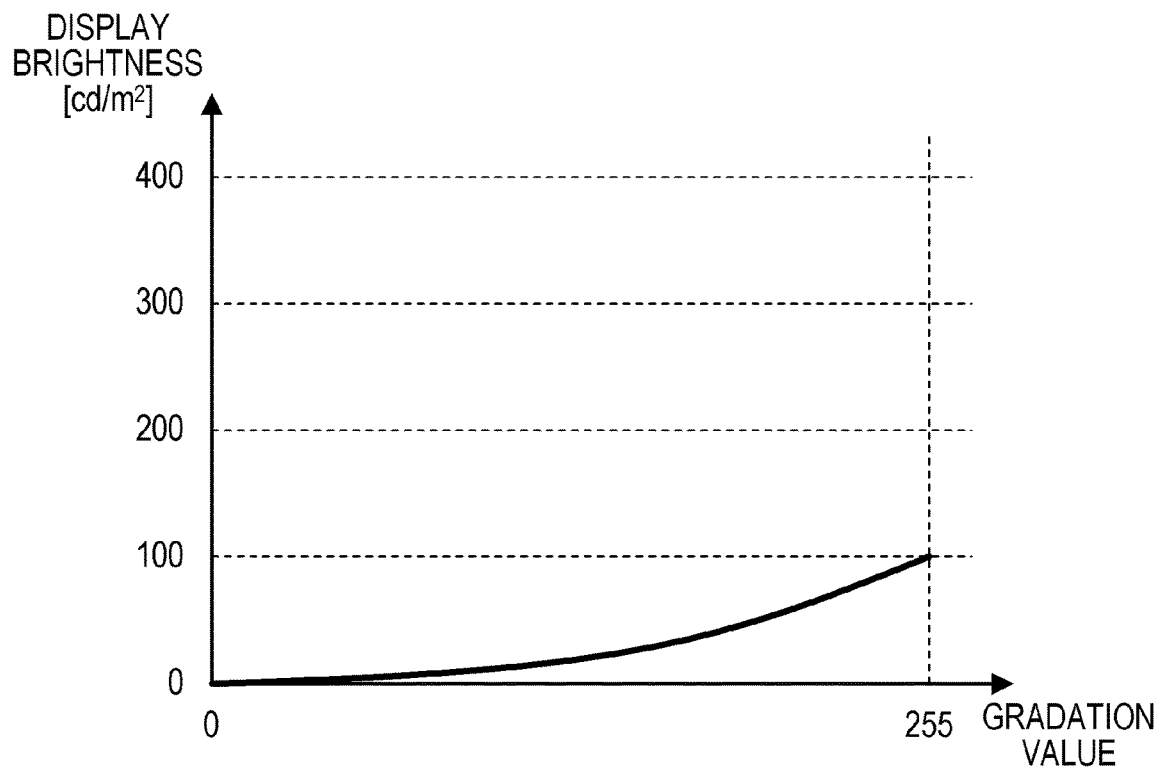

FIGS. 5A and 5B are diagrams showing examples of a correspondence relationship between gradation values of converted image data (or input image data) and display brightness of the display apparatus 100. FIG. 5A shows an example in which a brightness correction value of 1 is used and FIG. 5B shows an example in which a brightness correction value calculated according to Expression 1 is used. While the number of bits constituting image data is not particularly limited, in the examples shown in FIGS. 5A and 5B, a gradation value of image data is an 8-bit value (0 to 255). In addition, while the upper limit display brightness related to brightness information is not particularly limited, in the examples shown in FIGS. 5A and 5B, the upper limit display brightness related to brightness information is 400 $[cd/m^2]$.

As shown in FIG. 5A, in a case where a brightness correction value of 1 is used, converted image data is corrected and displayed so that display brightness corresponding to an upper limit (255) of possible gradation values of the converted image data coincides with 400 $[cd/m^2]$. As described earlier, a brightness correction value of 1 is used for an HDR image in a case where both an HDR image and an SDR image are displayed. Therefore, the HDR image is displayed with display brightness of which an upper limit coincides with 400 $[cd/m^2]$.

As shown in FIG. 5B, in a case where a brightness correction value calculated according to Expression 1 is used, converted image data is corrected and displayed so that display brightness corresponding to the upper limit (255) of possible gradation values of the converted image data coincides with 100 $[cd/m^2]$. As described earlier, a brightness correction value calculated according to Expression 1 is used for an SDR image in a case where both an HDR image and an SDR image are displayed. Therefore, the SDR image is displayed with display brightness of which an upper limit coincides with 100 $[cd/m^2]$.

As described above, according to the present embodiment, in a case where brightness information is acquired and a first image and a second image are displayed on a display unit (a screen), SDR image data (second image data) is corrected. Specifically, the SDR image data (the second image data) is corrected so that the first image is displayed in accordance with display brightness related to brightness information and the second image is displayed in accordance with display brightness which is lower than the display brightness related to brightness information. Accordingly, in a case of displaying a plurality of images on a display unit, each image can be displayed with favorable brightness with a simple configuration. Specifically, each image can be displayed with favorable brightness by image processing without having to adopt a configuration which enables emission brightness of a backlight unit to be partially changed, a configuration which enables a correspondence relationship between a gradation value input to a display unit and display brightness to be partially changed, and the like.

Moreover, while an example in which one or two images are displayed on a screen has been described in the present embodiment, three or more images may be displayed on the screen. In addition, while an example in which a maximum number of pieces of image data input to the display apparatus is two has been described in the present embodiment, the maximum number may be one or may be three or more. Furthermore, while an example in which one piece of converted image data is generated from one piece of input image data has been described in the present embodiment, a plurality of pieces of converted image data with mutually different gradation characteristics may be generated from one piece of input image data.

Second Embodiment

A second embodiment of the present invention will be described below. In the first embodiment, an example in which SDR image data is corrected so that an SDR image is displayed in accordance with predetermined display brightness (100 $[cd/m^2]$) has been described. In the present embodiment, an example in which SDR image data is corrected by a different method from the method in the first embodiment will be described. Hereinafter, configurations and processes which differ from those of the first embodiment will be described and descriptions of configurations and processes which are similar to those of the first embodiment will be omitted.

In the ST2084 standards, an upper limit of brightness of an HDR image is set to 10,000 $[cd/m^2]$. However, there is a limit to display brightness of display apparatuses and some have upper limit display brightness that is lower than 10,000 $[cd/m^2]$. In such a display apparatus, brightness information related to display brightness that is lower than 10,000 $[cd/m^2]$ is acquired and an HDR image is displayed in accordance with the display brightness that is lower than 10,000 $[cd/m^2]$.

Figure 6:
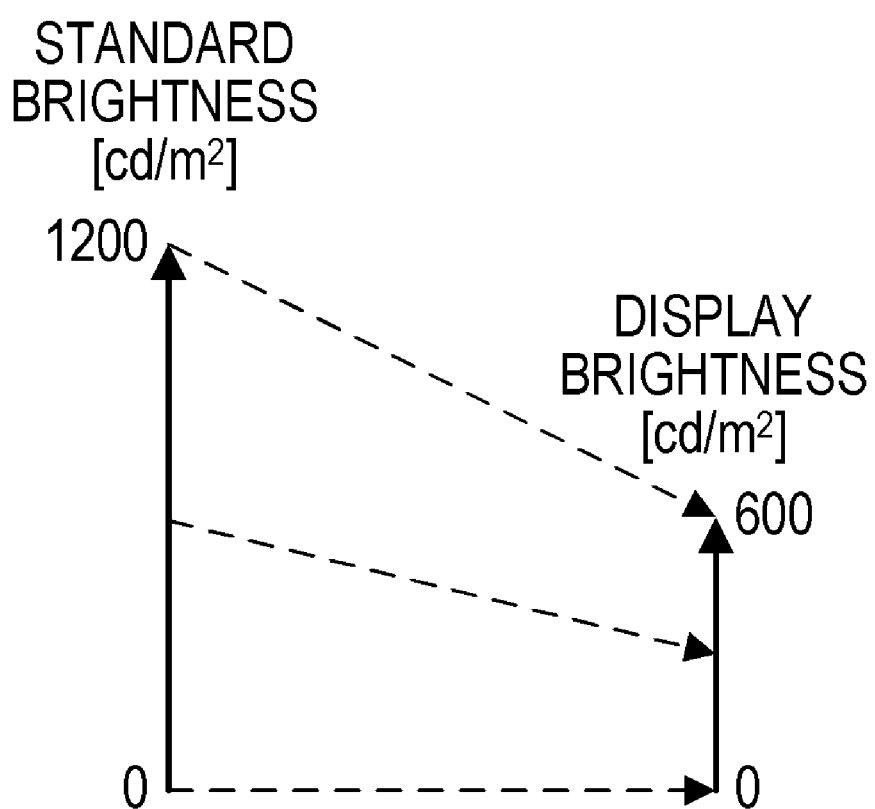
FIG. 6 is a diagram showing an example of a relationship between standard brightness and display brightness according to a second embodiment.

FIG. 6 shows an example of a correspondence relationship between brightness specified by a standard (standard brightness) and display brightness of a display apparatus. In FIG. 6, an upper limit of the standard brightness is 1200 $[cd/m^2]$ and an upper limit of the display brightness is 600 $[cd/m^2]$. In this case, as shown in FIG. 6, each standard brightness of an image (an HDR image) is expressed by display brightness that is ½ of the standard brightness. For example, standard brightness=1200 $[cd/m^2]$ is expressed by display brightness=600 $[cd/m^2]$. In addition, in a case where the user checks an HDR image with an upper limit of standard brightness of 1200 $[cd/m^2]$ and an SDR image, the HDR image and the SDR image are favorably displayed at a display brightness ratio (brightness of the HDR image: brightness of the SDR image) of 1200:100=12:1.

In consideration thereof, in the present embodiment, in a case where an HDR image and an SDR image are displayed on a display unit, at least SDR image data is corrected so that a ratio between the display brightness of the HDR image and the display brightness of the SDR image equals a predetermined ratio. As a result, in a case where the HDR image is displayed with lower display brightness than the standard brightness, display brightness of the SDR image is also reduced at a brightness reduction rate of the HDR image (a proportion of display brightness (display brightness of the HDR image) to the standard brightness).

Figure 7:
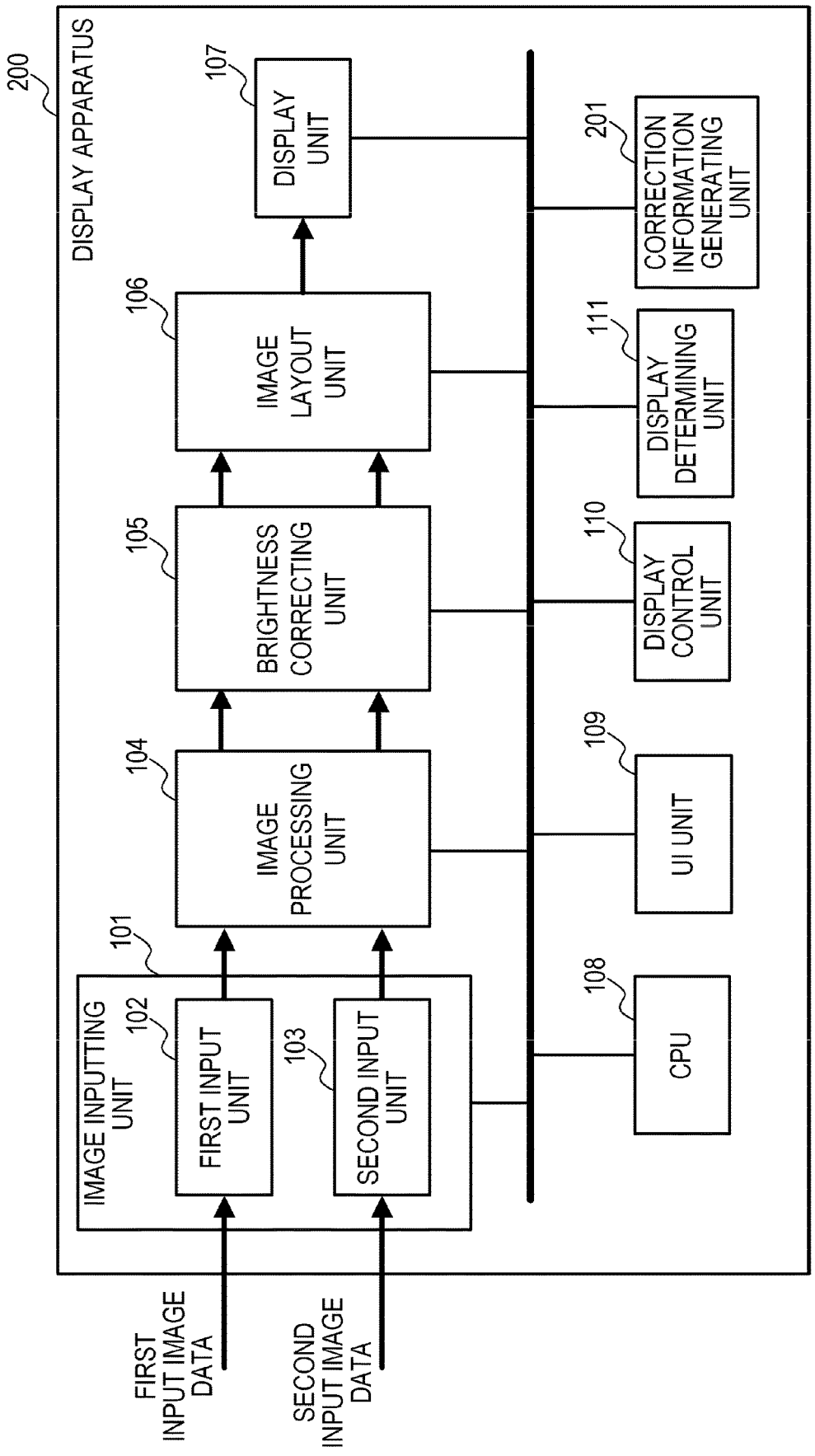
FIG. 7 is a block diagram showing an example of a configuration of a display apparatus according to the second embodiment.

FIG. 7 is a block diagram showing an example of a configuration of a display apparatus 200 according to the present embodiment. In FIG. 7, same functional units as in the first embodiment (FIG. 1) are assigned same reference characters as in the first embodiment. The display apparatus 200 includes the image inputting unit 101, the image processing unit 104, the brightness correcting unit 105, the image layout unit 106, the display unit 107, the CPU 108, the UI unit 109, the display control unit 110, the display determining unit 111, and a correction information generating unit 201. Hereinafter, an example in which upper limit display brightness related to brightness information is 600 $[cd/m^2]$ and a correspondence relationship between standard brightness of an HDR image and display brightness of the display apparatus 200 is the correspondence relationship shown in FIG. 6 will be described.

In a similar manner to the correction information generating unit 112 according to the first embodiment, the correction information generating unit 201 generates correction information based on a determination result of the display determining unit 111 and outputs the generated correction information to the brightness correcting unit 105. In the present embodiment, in a case where it is determined that both an HDR image and an SDR image are displayed, correction information is generated so that the display brightness of the HDR image:the display brightness of the SDR image=12:1 (a predetermined ratio). While correction information and a generation method thereof are not particularly limited, in the present embodiment, the correction information generating unit 201 further multiplies a brightness correction value calculated by the method according to the first embodiment with a ratio between upper limit display brightness related to brightness information and upper limit standard brightness (an upper limit of standard brightness). Accordingly, a brightness correction value corresponding to the SDR image is calculated. In addition, 1 is adopted as a brightness correction value corresponding to the HDR image in a similar manner to the first embodiment.

The upper limit standard brightness is determined in accordance with a data format of an HDR image. With the display apparatus 200, for example, the upper limit standard brightness is determined and used in accordance with gradation characteristics (gradation characteristics of converted image data corresponding to an HDR image) specified by the user. Specifically, correspondence relationships between gradation characteristics and upper limit standard brightness are determined in advance, and upper limit standard brightness corresponding to the specified gradation characteristics is selected and used. For example, upper limit standard brightness of 1200 $[cd/m^2]$ is used in a case where the HLG characteristics are specified and upper limit standard brightness of 10,000 $[cd/m^2]$ is used in a case where the PQ characteristics are specified.

For example, the correction information generating unit 201 calculates a brightness correction value corresponding to an SDR image using Expression 2 below.

Brightness correction value=$((100/\text{upper limit display brightness}) \times (\text{upper limit display brightness}/\text{upper limit standard brightness}))^{1/display\ gamma}$ (Expression 2)

Expression 2 can be simplified to Expression 3 as follows. In other words, in the present embodiment, a brightness correction value corresponding to an SDR image can be calculated based on upper limit standard brightness.

Brightness correction value=$(100/\text{upper limit standard brightness})^{1/display\ gamma}$ (Expression 3)

According to the process described above, the display brightness of an HDR image is unchanged but the display brightness of an SDR image is reduced to display brightness with a factor of $\frac{1}{12}$. As a result, the HDR image is displayed with display brightness of which an upper limit coincides with 600 $[cd/m^2]$ and the SDR image is displayed with display brightness of which an upper limit coincides with 50 (=600/12) $[cd/m^2]$. In other words, the HDR image and the SDR image are displayed at a display brightness ratio (brightness of the HDR image:brightness of the SDR image) of 12:1. Moreover, the predetermined ratio is not limited to 12:1.

As described above, according to the present embodiment, SDR image data (second image data) is corrected so that a ratio between display brightness of an HDR image and display brightness of an SDR image equals a predetermined ratio. Accordingly, in a case of displaying a plurality of images on a display unit, the respective images can be displayed at a favorable brightness ratio with a simple configuration.

Third Embodiment

A third embodiment of the present invention will be described below. Hereinafter, configurations and processes which differ from those of the first embodiment will be described and descriptions of configurations and processes which are similar to those of the first embodiment will be omitted. The configuration of the present embodiment may be combined with the configuration of the second embodiment. In the first embodiment, an example in which brightness information and gradation characteristic information are acquired in accordance with user operations has been described. In the present embodiment, an example in which brightness information and gradation characteristic information are included in metadata of input image data and the brightness information and the gradation characteristic information are acquired from the metadata will be described.

Figure 8:
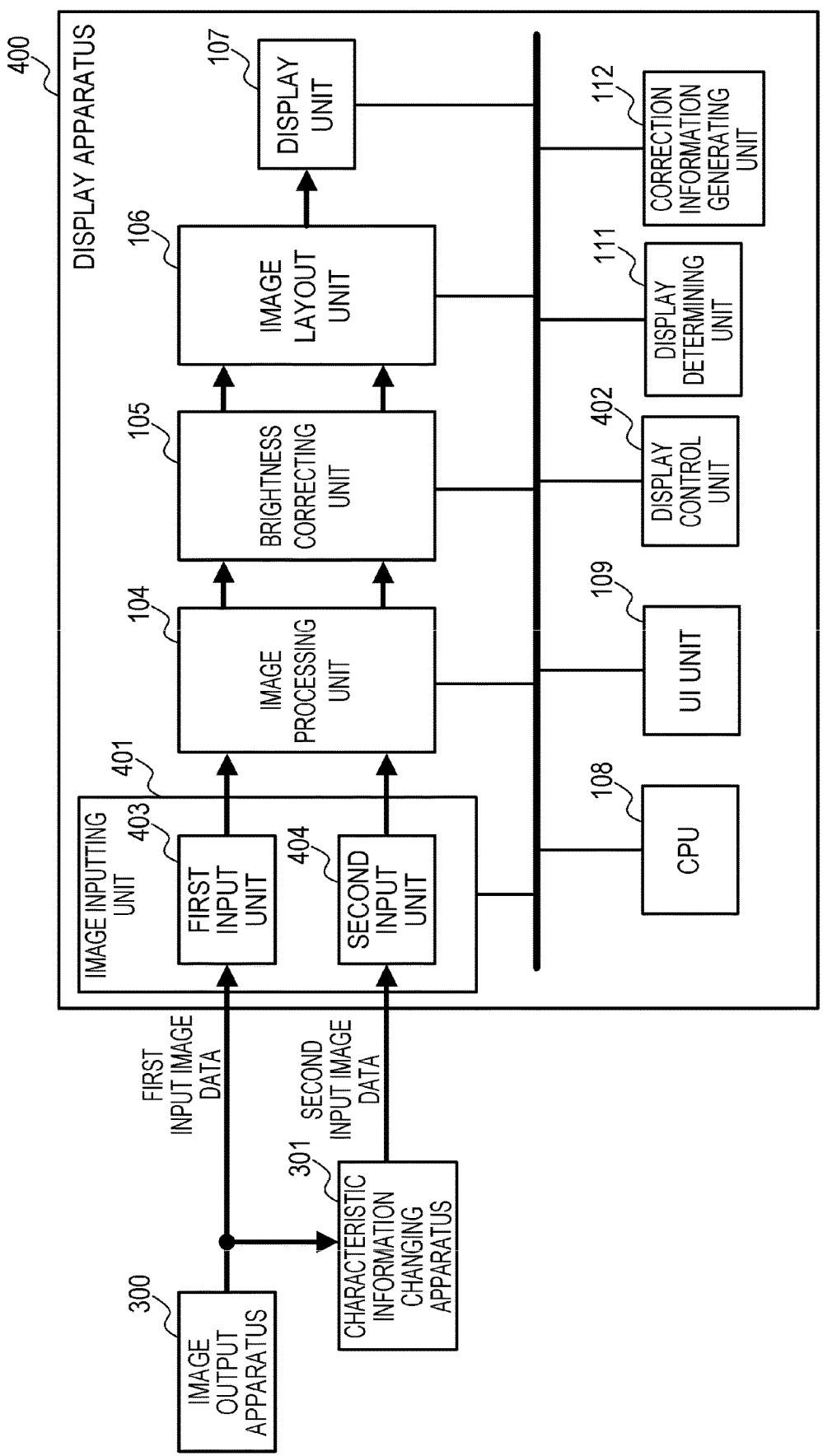
FIG. 8 is a block diagram showing an example of a configuration of a display apparatus according to a third embodiment.

FIG. 8 is a block diagram showing an example of a configuration of a display apparatus 400 according to the present embodiment. In FIG. 8, same functional units as in the first embodiment (FIG. 1) are assigned same reference characters as in the first embodiment. An image output apparatus 300 and a characteristic information changing apparatus 310 are connected to the display apparatus 400. In addition, the image output apparatus 300 and the characteristic information changing apparatus 310 are connected to each other. While a connection method between apparatuses is not particularly limited, in the present embodiment, a plurality of apparatuses are connected to each other using SDI cables.

The image output apparatus 300 outputs image data. The image output apparatus 300 is capable of outputting HDR image data. As the image output apparatus 300, a digital camera, a recorder, a PC, or the like can be used. In the present embodiment, metadata including brightness information and gradation characteristic information is added to image data, and the image data after the metadata is added thereto is output from the image output apparatus 300. In the present embodiment, an SDI signal is output as image data from the image output apparatus 300, and metadata is added to an ancillary area of the SDI signal. Brightness information included in the metadata is, for example, information related to upper limit standard brightness corresponding to the gradation characteristic information included in the metadata or information related to maximum brightness of standard brightness of image data output from the image output apparatus 300.

While gradation characteristics of image data output from the image output apparatus 300 are not particularly limited, in the present embodiment, an example in which HDR image data with the PQ characteristics is output from the image output apparatus 300 will be described. In addition, in the present embodiment, an example in which gradation characteristic information related to the PQ characteristics is included in metadata of the HDR image data will be described. In other words, in the present embodiment, gradation characteristic information related to gradation characteristics of image data output from the image output apparatus 300 is included in the metadata of the image data output from the image output apparatus 300. Moreover, the gradation characteristics of image data output from the image output apparatus 300 may differ from gradation characteristics related to the gradation characteristic information included in the metadata of the image data.

The characteristic information changing apparatus 310 subjects image data output from the image output apparatus 300 to a process of changing the gradation characteristic information included in the metadata and outputs the image data after being subjected to the process. A PC or the like can be used as the characteristic information changing apparatus 310. Alternatively, the characteristic information changing apparatus 310 may be provided in the image output apparatus 300.

The gradation characteristics of image data output from the characteristic information changing apparatus 310 are not particularly limited. In the present embodiment, the characteristic information changing apparatus 310 converts image data output from the image output apparatus 300 (HDR image data with the PQ characteristics) into SDR image data with the gamma 2.2 characteristics. The characteristic information changing apparatus 310 adds metadata including gradation characteristic information related to the gamma 2.2 characteristics to the SDR image data. In addition, the characteristic information changing apparatus 310 outputs the obtained SDR image data (SDR image data which has the gamma 2.2 characteristics and to which metadata including gradation characteristic information related to the gamma 2.2 characteristics has been added). In other words, in the present embodiment, gradation characteristic information related to gradation characteristics of image data output from the characteristic information changing apparatus 310 is included in metadata of the image data output from the characteristic information changing apparatus 310. Moreover, the gradation characteristics of image data output from the characteristic information changing apparatus 310 may differ from gradation characteristics related to the gradation characteristic information included in the metadata of the image data. Alternatively, the process of converting the gradation characteristics of image data input to the characteristic information changing apparatus 310 may not be performed.

The display apparatus 400 includes an image inputting unit 401, the image processing unit 104, the brightness correcting unit 105, the image layout unit 106, the display unit 107, the CPU 108, the UI unit 109, a display control unit 402, the display determining unit 111, and the correction information generating unit 112.

The image inputting unit 401 acquires image data (input image data) from outside of the display apparatus 400 and outputs the input image data to the image processing unit 104 in a similar manner to the image inputting unit 101 according to the first embodiment. Furthermore, the image inputting unit 401 outputs metadata added to the acquired image data to the display control unit 402. In the present embodiment, the image inputting unit 401 includes a first input unit 403 and a second input unit 404. The first input unit 403 acquires image data (first input image data) output from the image output apparatus 300 and outputs the first input image data to the image processing unit 104. Furthermore, the first input unit 403 outputs metadata added to the first input image data to the display control unit 402. The second input unit 404 acquires image data (second input image data) output from the characteristic information changing apparatus 310 and outputs the second input image data to the image processing unit 104. Furthermore, the characteristic information changing apparatus 310 outputs metadata added to the second input image data to the display control unit 402.

The display control unit 402 sets gradation characteristic information, brightness information, and layout information in a similar manner to the display control unit 110 according to the first embodiment. However, in the present embodiment, the display control unit 402 acquires gradation characteristic information and brightness information from the metadata output from the image inputting unit 401. In addition, the display control unit 402 sets the gradation characteristic information acquired from the metadata to the image processing unit 104 and sets the brightness information acquired from the metadata to the display unit 107. Specifically, the gradation characteristic information included in the metadata output from the first input unit 403 is set as first characteristic information and the gradation characteristic information included in the metadata output from the second input unit 404 is set as second characteristic information. Furthermore, brightness information included in the metadata output from the first input unit 403 is set. Alternatively, brightness information included in the metadata output from the second input unit 404 may be set.

Alternatively, gradation characteristic information may be acquired in accordance with a user operation in a similar manner to the first embodiment. In this case, one of the gradation characteristic information acquired from metadata and the gradation characteristic information acquired in accordance with the user operation is set. For example, in a case where gradation characteristic information is acquired from metadata, the gradation characteristic information acquired from the metadata is set regardless of whether or not gradation characteristic information is acquired in accordance with a user operation. In addition, in a case where gradation characteristic information is not acquired from metadata, gradation characteristic information acquired in accordance with a user operation is set. Alternatively, in a case where gradation characteristic information is acquired in accordance with a user operation, the gradation characteristic information acquired in accordance with the user operation may be set regardless of whether or not gradation characteristic information is acquired from metadata. One of the first characteristic information and the second characteristic information may be gradation characteristic information acquired from metadata and the other may be gradation characteristic information acquired in accordance with a user operation. In addition, a plurality of pieces of gradation characteristic information may be included in metadata of one piece of input image data, the plurality of pieces of gradation characteristic information may be set, and a plurality of pieces of converted image data respectively corresponding to the plurality of pieces of gradation characteristic information may be generated.

Alternatively, brightness information may be acquired in accordance with a user operation in a similar manner to the first embodiment. In this case, one of the brightness information acquired from metadata and the brightness information acquired in accordance with the user operation is set. For example, in a case where brightness information is acquired from metadata, the brightness information acquired from the metadata is set regardless of whether or not brightness information is acquired in accordance with a user operation. In addition, in a case where brightness information is not acquired from metadata, brightness information acquired in accordance with a user operation is set. Alternatively, in a case where brightness information is acquired in accordance with a user operation, the brightness information acquired in accordance with the user operation may be set regardless of whether or not brightness information is acquired from metadata. Furthermore, in a case where a display apparatus is unable to perform display with upper limit display brightness related to brightness information included in metadata, the brightness information included in the metadata may be corrected to information related to display brightness (an upper limit of display brightness) which can be adopted by the display apparatus and the brightness information after the correction may be set. One of the brightness information and the gradation characteristic information may be acquired from metadata and the other may be acquired in accordance with a user operation.

Moreover, in a case where gradation characteristics of input image data coincide with gradation characteristics related to set gradation characteristic information, same image data as input image data is obtained as converted image data. Therefore, in this case, a process of converting gradation characteristics of input image data by the image processing unit 104 may be omitted. However, a display gamma assumed by the input image data may differ from the display gamma of the display unit 107. In this case, even if the gradation characteristics of input image data coincide with the gradation characteristics related to the set gradation characteristic information, the display gamma assumed by the input image data must be conformed to the display gamma of the display unit 107.

As described above, according to the present embodiment, brightness information and gradation characteristic information are acquired from metadata of input image data. Accordingly, a user operation for acquiring brightness information and gradation characteristic information is no longer necessary and a load on the user can be reduced. In addition, according to the present embodiment, in a case of displaying a plurality of images on a display unit, each image can be displayed with favorable brightness with a simple configuration in a similar manner to the first embodiment. It is highly likely that information (brightness information and gradation characteristic information) included in metadata is information to be used in a case of checking an image. Therefore, according to the present embodiment, in a case of displaying a plurality of images on a display unit, each image can be more reliably displayed with favorable brightness.

Moreover, while an example in which metadata is added to an ancillary area of an SDI signal has been described in the present embodiment, this is not restrictive. For example, metadata may be added to InfoFrame of a High Definition Multimedia Interface (HDMI; registered trademark).

Fourth Embodiment

A fourth embodiment of the present invention will be described below. In the first embodiment, an example in which an SDR image is displayed in accordance with predetermined display brightness (100 [cd/m$^2$]) regardless of display brightness of an HDR image has been described. However, in a case where an HDR image is displayed with high brightness such as 10,000 [cd/m$^2$] and an SDR image is displayed at 100 [cd/m$^2$], an excessive difference in display brightness between the HDR image and the SDR image makes the SDR image less visible. In consideration thereof, in the present embodiment, an example will be described in which display brightness of an SDR image is switched to another display brightness depending on whether or not display brightness related to brightness information is equal to or higher than a predetermined threshold. Hereinafter, configurations and processes which differ from those of the first embodiment will be described and descriptions of configurations and processes which are similar to those of the first embodiment will be omitted. The configuration of the present embodiment may be combined with the configuration of the third embodiment.

Figure 9:
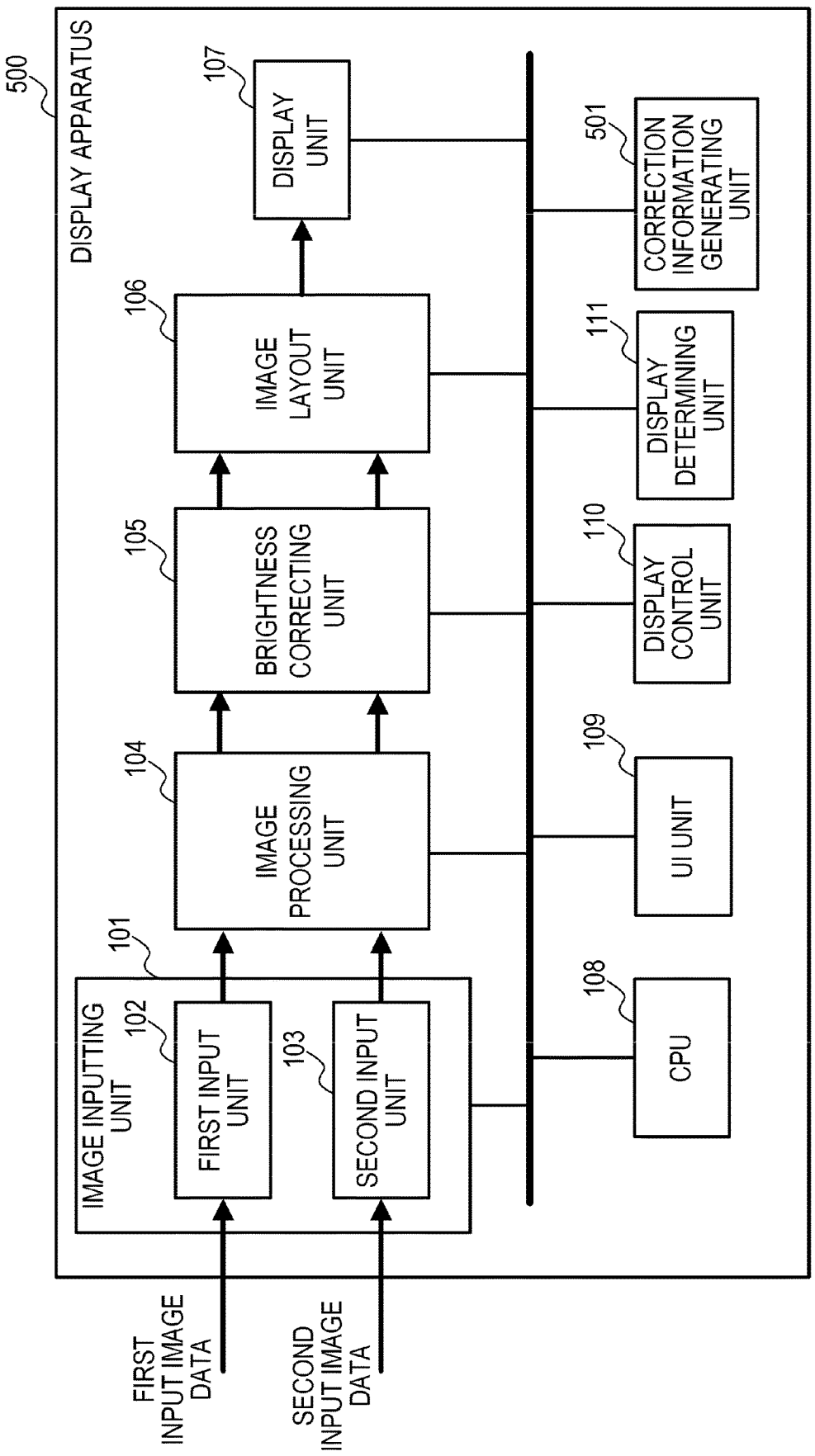
FIG. 9 is a block diagram showing an example of a configuration of a display apparatus according to a fourth embodiment.

FIG. 9 is a block diagram showing an example of a configuration of a display apparatus 500 according to the present embodiment. In FIG. 9, same functional units as in the first embodiment (FIG. 1) are assigned same reference characters as in the first embodiment. The display apparatus 500 includes the image inputting unit 101, the image processing unit 104, the brightness correcting unit 105, the image layout unit 106, the display unit 107, the CPU 108, the UI unit 109, the display control unit 110, the display determining unit 111, and a correction information generating unit 501.

In a similar manner to the correction information generating unit 112 according to the first embodiment, the correction information generating unit 501 generates correction information based on a determination result of the display determining unit 111 and brightness information, and outputs the generated correction information to the brightness correcting unit 105. However, in the present embodiment, in a case where an HDR image and an SDR image are displayed on the display unit 107 and display brightness (upper limit display brightness) related to the brightness information is lower than a predetermined threshold, correction information is generated so that the SDR image is displayed in accordance with predetermined display brightness. In addition, in the present embodiment, in a case where an HDR image and an SDR image are displayed on the display unit 107 and the upper limit display brightness is equal to or higher than the predetermined threshold, correction information is generated so that a ratio between display brightness of the HDR image and display brightness of the SDR image equals a predetermined ratio. Specifically, 1 is adopted as a brightness correction value corresponding to the HDR image in a similar manner to the first embodiment. In addition, a brightness correction value corresponding to the SDR image is calculated according to the method described below. Moreover, correction information and a generation method thereof are not particularly limited.

First, a case where an HDR image and an SDR image are displayed on the display unit 107 and upper limit display brightness is lower than a predetermined threshold will be described. In this case, a brightness correction value corresponding to the SDR image is calculated so that the SDR image is displayed in accordance with predetermined display brightness. While the predetermined threshold and the predetermined display brightness are not particularly limited, in the present embodiment, an example in which the predetermined threshold is 1000 [cd/m$^2$] and the predetermined display brightness is 100 [cd/m$^2$] will be described. In the present embodiment, in a case where an HDR image and an SDR image are displayed on the display unit 107 and upper limit display brightness is lower than 1000 [cd/m$^2$], the brightness correction value corresponding to the SDR image is calculated using Expression 1 according to the first embodiment.

Next, a case where an HDR image and an SDR image are displayed on the display unit 107 and upper limit display brightness is equal to or higher than the predetermined threshold will be described. In this case, a brightness correction value corresponding to the SDR image is calculated so that a ratio between display brightness of the HDR image and display brightness of the SDR image equals a predetermined ratio. While the predetermined ratio is not particularly limited, in the present embodiment, an example in which the predetermined ratio (display brightness of the HDR image: display brightness of the SDR image) is 1:10 will be described. In the present embodiment, in a case where an HDR image and an SDR image are displayed on the display unit 107 and upper limit display brightness is equal to or higher than the predetermined threshold, the brightness correction value corresponding to the SDR image is calculated using Expression 4 below.

$$\text{Brightness correction value} = (1/10)^{1/display\ gamma} \quad \text{(Expression 4)}$$

Figure 10:
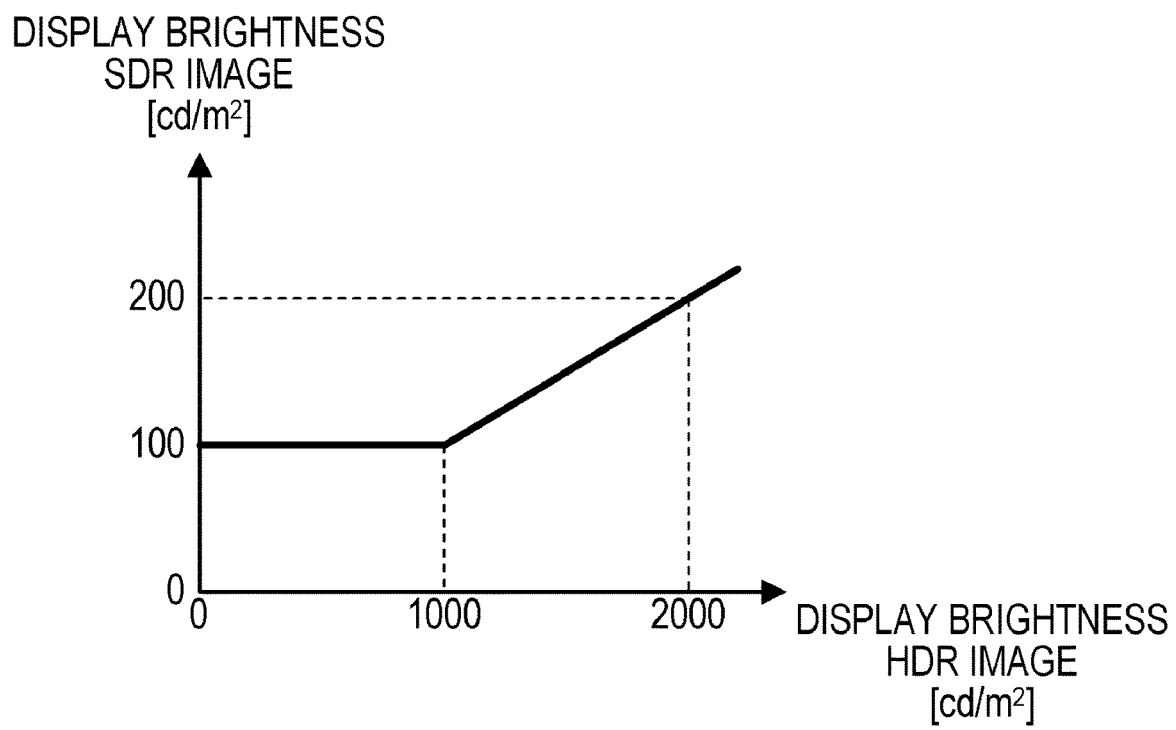
FIG. 10 is a diagram showing an example of display brightness according to the fourth embodiment.

FIG. 10 shows an example of a correspondence relationship between an upper limit of display brightness of an HDR image and an upper limit of display brightness of an SDR image. With the method described above according to the present embodiment, in a case where the upper limit of display brightness of the HDR image is lower than 1000 [cd/m$^2$], the SDR image is displayed with display brightness of which an upper limit coincides with 100 [cd/m$^2$]. In addition, in a case where the upper limit of display brightness of the HDR image is equal to or higher than 1000 [cd/m$^2$], the SDR image is displayed with display brightness which is $\frac{1}{10}$ of the display brightness of the HDR image.

As described above, according to the present embodiment, display brightness of an SDR image is switched to another display brightness depending on whether or not display brightness related to brightness information is equal to or higher than a predetermined threshold. Accordingly, in a case of displaying a plurality of images on a display unit, each image can be displayed with favorable brightness with a simple configuration in a similar manner to the first and second embodiments and, at the same time, a decline in visibility of an SDR image can be suppressed.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-068433, filed on Mar. 30, 2016, which is hereby incorporated by reference herein in its entirety.

What is claimed is:

1. A display apparatus comprising:
   an input unit configured to acquire data of an image;
   a correcting unit configured to correct the data of the image; and
   a display unit configured to display the image on a screen,
   wherein in a case where an SDR image and an HDR image are displayed on the screen so as to be arranged side by side, the correcting unit corrects data of the SDR image so that an upper limit in display brightness of the SDR image is lower than an upper limit in display brightness of the HDR image,
   wherein data of the SDR image and data of the HDR image are generated from the same image data, and
   wherein the same image data is data with PQ characteristics or HLG characteristics.

2. The display apparatus according to claim 1, wherein the data of the SDR image is image data generated from the data of the HDR image.

3. The display apparatus according to claim 1, wherein each of the SDR image and the HDR image is a moving image.

4. The display apparatus according to claim 1, wherein the SDR image and the HDR image are images of the same object.

5. The display apparatus according to claim 1, wherein the display unit includes a self-luminous display panel.

6. The display apparatus according to claim 1, wherein a number of bits of the data of the SDR image is equal to a number of bits of the data of the HDR image.

7. The display apparatus according to claim 1, wherein in a case where the SDR image and the HDR image are displayed on the screen so as to be arranged side by side, the upper limit in the display brightness of the HDR image is equal to an upper limit in display brightness of the display apparatus.

8. The display apparatus according to claim 7, further comprising a UI unit configured to receive a user operation for specifying the upper limit in the display brightness of the display apparatus.

9. The display apparatus according to claim 1, wherein data of the SDR image acquired by the input unit is data with gamma 2.2 characteristics or gamma 2.6 characteristics.

10. The display apparatus according to claim 1, wherein the display unit includes a liquid crystal panel.

11. The display apparatus according to claim 10, wherein the display unit includes the liquid crystal panel and a backlight unit configured to illuminate the liquid crystal panel, and
   wherein in a case where the SDR image and the HDR image are displayed on the screen so as to be arranged side by side, the backlight unit illuminates an area, in which the SDR image is to be displayed, of the liquid crystal panel and an area, in which the HDR image is to be displayed, of the liquid crystal panel with the same brightness.

12. The display apparatus according to claim 11, wherein in a case where the SDR image and the HDR image are displayed on the screen so as to be arranged side by side, in the area in which the SDR image is to be displayed, the liquid crystal panel transmits light from the backlight unit at a transmittance in accordance with the data of the SDR image corrected by the correcting unit.

13. The display apparatus according to claim 1, wherein the input unit includes an input terminal.

14. The display apparatus according to claim 13, wherein the input terminal is an SDI input terminal, and
wherein the data of the image acquired by the input unit is an SDI signal.

15. A display method comprising:
acquiring data of an image;
correcting the data of the image; and
displaying the image on a screen of a display unit,
wherein in a case where an SDR image and an HDR image are displayed on the screen so as to be arranged side by side, in the correcting, data of an image acquired in the acquiring is corrected to data of the SDR image so that an upper limit in display brightness of the SDR image is lower than an upper limit in display brightness of the HDR image,
wherein data of the SDR image and data of the HDR image are generated from the same image data, and
wherein the same image data is data with PQ characteristics or HLG characteristics.

16. A non-transitory computer-readable medium that stores a program, wherein the program causes a computer to execute a method comprising:
acquiring data of an image;
correcting the data of the image; and
displaying the image on a screen of a display unit,
wherein in a case where an SDR image and an HDR image are displayed on the screen so as to be arranged side by side, in the correcting, data of an image acquired in the acquiring is corrected to data of the SDR image so that an upper limit in display brightness of the SDR image is lower than an upper limit in display brightness of the HDR image,
wherein data of the SDR image and data of the HDR image are generated from the same image data, and
wherein the same image data is data with PQ characteristics or HLG characteristics.

17. A display apparatus comprising:
an input unit configured to acquire data of an image;
a correcting unit configured to correct the data of the image; and
a display unit configured to display the image on a screen,
wherein the correcting unit corrects data of an image acquired by the input unit to data of an SDR image so that (a) an upper limit in display brightness of the SDR image is equal to a first brightness, in a first case where the SDR image is displayed on the screen and an HDR image is not displayed on the screen, and (b) the upper limit in the display brightness of the SDR image is equal to a second brightness, which is lower than the first brightness, in a second case where the SDR image and the HDR image are displayed on the screen, and
wherein data of an image acquired by the input unit, the image corresponding to the HDR image, is data with PQ characteristics or HLG characteristics.

18. The display apparatus according to claim 17, wherein the correcting unit does not correct the data acquired by the input unit in the first case, and corrects the data acquired by the input unit in the second case.

19. The display apparatus according to claim 17, wherein in a case where the SDR image and the HDR image are displayed on the screen so as to be arranged side by side, the upper limit in the display brightness of the HDR image is equal to an upper limit in display brightness of the display apparatus.

20. The display apparatus according to claim 19, further comprising a UI unit configured to receive a user operation for specifying the upper limit in the display brightness of the display apparatus.

21. The display apparatus according to claim 17, wherein data of the SDR image acquired by the input unit is data with gamma 2.2 characteristics or gamma 2.6 characteristics.

22. The display apparatus according to claim 17, wherein the data of the SDR image is image data generated from the data of the HDR image.

23. The display apparatus according to claim 17, wherein each of the SDR image and the HDR image is a moving image.

24. The display apparatus according to claim 17, wherein the SDR image and the HDR image are images of the same object.

25. The display apparatus according to claim 17, wherein the display unit includes a liquid crystal panel.

26. The display apparatus according to claim 25, wherein the display unit further includes a backlight unit configured to illuminate the liquid crystal panel, and
wherein in a case where the SDR image and the HDR image are displayed on the screen so as to be arranged side by side, the backlight unit illuminates an area, in which the SDR image is to be displayed, of the liquid crystal panel and an area, in which the HDR image is to be displayed, of the liquid crystal panel with the same brightness.

27. The display apparatus according to claim 26, wherein in a case where the SDR image and the HDR image are displayed on the screen so as to be arranged side by side, in the area in which the SDR image is to be displayed, the liquid crystal panel transmits light from the backlight unit at a transmittance in accordance with the data of the SDR image corrected by the correcting unit.

28. The display apparatus according to claim 17, wherein the display unit includes a self-luminous display panel.

29. The display apparatus according to claim 17, wherein a number of bits of the data of the SDR image is equal to a number of bits of the data of the HDR image.

30. The display apparatus according to claim 17, wherein the input unit includes an input terminal.

31. The display apparatus according to claim 30, wherein the input terminal is an SDI input terminal, and
wherein the data of the image acquired by the input unit is an SDI signal.

32. A display method comprising:
acquiring data of an image;
correcting the data of the image; and
displaying the image on a screen of a display unit,
wherein in the correcting, data of an image acquired in the acquiring is corrected to data of an SDR image so that (a) an upper limit in display brightness of the SDR image is equal to a first brightness, in a first case where the SDR image is displayed on the screen and an HDR image is not displayed on the screen, and (b) the upper limit in the display brightness of the SDR image is equal to a second brightness, which is lower than the first brightness, in a second case where the SDR image and the HDR image are displayed on the screen, and
wherein data of an image acquired in the acquiring, the image corresponding to the HDR image, is data with PQ characteristics or HLG characteristics.

33. A non-transitory computer-readable medium that stores a program, wherein the program causes a computer to execute a method comprising:
acquiring data of an image;
correcting the data of the image; and
displaying the image on a screen of a display unit,
wherein in the correcting, data of an image acquired in the acquiring is corrected to data of an SDR image so that (a) an upper limit in display brightness of the SDR image is equal to a first brightness, in a first case where the SDR image is displayed on the screen and an HDR image is not displayed on the screen, and (b) the upper limit in the display brightness of the SDR image is equal to a second brightness, which is lower than the first brightness, in a second case where the SDR image and the HDR image are displayed on the screen, and
wherein data of an image acquired in the acquiring, the image corresponding to the HDR image, is data with PQ characteristics or HLG characteristics.

* * * * *